(12) United States Patent
Volynets et al.

(10) Patent No.: US 11,868,413 B2
(45) Date of Patent: Jan. 9, 2024

(54) METHODS AND SERVERS FOR RANKING DIGITAL DOCUMENTS IN RESPONSE TO A QUERY

(71) Applicant: YANDEX EUROPE AG, Lucerne (CH)

(72) Inventors: Eduard Mechislavovich Volynets, Minsk (BY); Dzianis Sergeevich Pastushyk, Brest (BY); Yevgeny Aleksandrovich Grechnikov, Moscow (RU)

(73) Assignee: DIRECT CURSUS TECHNOLOGY L.L.C, Dubai (AE)

( * ) Notice: Subject to any disclaimer, the term of this patent is extended or adjusted under 35 U.S.C. 154(b) by 98 days.

(21) Appl. No.: 17/553,099

(22) Filed: Dec. 16, 2021

(65) Prior Publication Data

US 2022/0197958 A1     Jun. 23, 2022

(30) Foreign Application Priority Data

Dec. 22, 2020    (RU) .................................. 2020142462

(51) Int. Cl.
   *G06F 16/953*    (2019.01)
   *G06N 3/08*      (2023.01)
   *G06F 16/93*     (2019.01)
   *G06N 5/01*      (2023.01)

(52) U.S. Cl.
   CPC ............ *G06F 16/953* (2019.01); *G06F 16/93* (2019.01); *G06N 3/08* (2013.01); *G06N 5/01* (2023.01)

(58) Field of Classification Search
   CPC ......... G06F 16/953; G06F 16/93; G06N 5/01; G06N 3/08
   See application file for complete search history.

(56) References Cited

U.S. PATENT DOCUMENTS

| | | | | |
|---|---|---|---|---|
| 5,404,514 | A | * | 4/1995 | Kageneck ............. G06F 16/313 707/E17.084 |
| 5,826,261 | A | * | 10/1998 | Spencer ................ G06F 16/334 707/999.005 |
| 7,269,546 | B2 | | 9/2007 | Stensmo |
| 8,316,030 | B2 | | 11/2012 | Koperda et al. |
| 8,346,791 | B1 | | 1/2013 | Shukla et al. |
| 8,423,546 | B2 | | 4/2013 | Gherman et al. |
| 8,447,758 | B1 | | 5/2013 | Adler et al. |

(Continued)

*Primary Examiner* — Mark E Hershley
(74) *Attorney, Agent, or Firm* — BCF LLP

(57) ABSTRACT

A method and server for ranking digital documents for a query are disclosed. T server hosts a search engine associated with an inverted index. The method includes accessing inverted index for retrieving query-independent data for a first document-term pair and a second document-term pair, where the query-independent data is indicative of (i) a term-specific occurrence of the first term in content of the document and (ii) a term-specific occurrence of the second term in the content of the document. The method includes generating a query-dependent feature using the query-independent data and which is indicative of a group occurrence of the first term with the second term in the content of the document. The method includes generating a ranking feature for the given document based on at least the first term, the second term, and the query-dependent feature, and ranking the given document based on at least the ranking feature.

16 Claims, 7 Drawing Sheets

(56) References Cited

U.S. PATENT DOCUMENTS

| | | | |
|---|---|---|---|
| 8,938,438 B2 | 1/2015 | Nijjer | |
| 9,727,603 B1 | 8/2017 | Heiler et al. | |
| 10,387,568 B1 | 8/2019 | Cheng et al. | |
| 10,417,687 B1 | 9/2019 | Reel et al. | |
| 2006/0218115 A1 | 9/2006 | Goodman et al. | |
| 2008/0059187 A1* | 3/2008 | Roitblat | G06F 16/3344 |
| | | | 707/999.005 |
| 2008/0288483 A1* | 11/2008 | Lin | G06F 16/334 |
| | | | 707/999.005 |
| 2009/0006360 A1* | 1/2009 | Liao | G06F 16/284 |
| | | | 707/999.005 |
| 2009/0070298 A1* | 3/2009 | Thione | G06F 16/3344 |
| 2009/0125498 A1* | 5/2009 | Cao | G06F 16/3334 |
| | | | 707/999.005 |
| 2009/0327266 A1* | 12/2009 | Tankovich | G06F 16/3331 |
| | | | 707/999.005 |
| 2010/0121838 A1* | 5/2010 | Tankovich | G06F 16/951 |
| | | | 707/723 |
| 2010/0223276 A1* | 9/2010 | Al-Shameri | G06V 20/13 |
| | | | 707/769 |
| 2011/0022600 A1* | 1/2011 | Sathe | G06F 16/319 |
| | | | 707/742 |
| 2011/0270820 A1* | 11/2011 | Agarwal | G06F 16/31 |
| | | | 707/E17.108 |
| 2012/0166415 A1 | 6/2012 | Lewallen et al. | |
| 2016/0103836 A1 | 4/2016 | Lee et al. | |
| 2016/0103837 A1 | 4/2016 | Lee et al. | |
| 2017/0091692 A1* | 3/2017 | Guo | G06F 16/24544 |
| 2018/0365253 A1 | 12/2018 | Francis et al. | |
| 2019/0102413 A1* | 4/2019 | Hsu | G06F 16/2237 |
| 2020/0089684 A1 | 3/2020 | Gotmanov et al. | |
| 2020/0380038 A1* | 12/2020 | Rosset | G06F 16/951 |

\* cited by examiner

METHODS AND SERVERS FOR RANKING DIGITAL DOCUMENTS IN RESPONSE TO A QUERY

CROSS-REFERENCE

The present application claims priority to Russian Patent Application No. 2020142462, entitled "Methods and Servers for Ranking Digital Documents in Response to a Query", filed Dec. 22, 2020, the entirety of which is incorporated herein by reference.

FIELD

The present technology relates to search engine technologies. In particular, the present technology is directed to methods and servers for ranking digital documents in response to a query.

BACKGROUND

The Internet provides access to a wide variety of resources, for example, video files, image files, audio files, or Web pages. Search engines are used to search these resources. For example, digital images that satisfy a user's informational need can be identified by a search engine in response to receiving a user query submitted by a user. User queries can be composed of one or more query terms. The search system selects and ranks search results based on their relevance to the user query and on their importance or quality relative to other search results and also provides top search results to the user.

Search engine systems comprise a component called an inverted index that includes a large number of posting lists associated with respective search terms and stores indications of documents that contain the respective search terms. Such data structures allow reducing the time, memory, and processing resources to perform searches.

During a search, the system retrieves information related to terms (from an in-use query) from the inverted index and is configured to use this information for ranking documents in response to the in-use query. The data stored in the inverted index is query-independent and term-specific. Processing the retrieved data in real-time for ranking documents is a difficult task due to the tradeoff between quality of ranking and the required processing time therefor.

U.S. Pat. No. 10,417,687 entitled "Generating modified query to identify similar items in a data store" and issued on Sep. 17, 2019, discloses techniques for identifying similar items in a data store by generating a modified query from a user supplied query and from information stored about particular item in the data store. Pre-determined descriptive terms can be designated as useful for identifying items, and these terms can be located within keyword data for a particular item. Item correlations can also be identified with respect to a category designation of the item. The modified query can be generated based upon the pre-determined descriptive terms in the item keyword data and the item correlations.

SUMMARY

Embodiments of the present technology have been developed based on developers' appreciation of at least one technical problem associated with the prior art approaches to object classification.

In at least one broad aspect of the present technology, there is provided a server executing a plurality of computer-implemented algorithms herein referred to as a "search engine" that is broadly configured to provide search results in response to a query submitted by a user of an electronic device.

Broadly speaking, a web search engine is a software system that is designed to carry out web searches. Search results are generally presented in a ranked format—that is, search results are presented in a list ranked based on relevance to the query. The information is typically displayed to a user via a Search Engine Results Page (SERP). The search results can be digital documents, such as, but not limited to, web pages, images, videos, infographics, articles, research papers, and other types of digital files.

In at least one aspect of the present technology, the server is communicatively coupled with a storage device storing a structured collection of data herein referred to as an "inverted index". Broadly speaking, the inverted index is a data structure that is used as a component of search engine indexing algorithms. For example, initially, a forward index may be generated, which stores lists of words per document—then, the forward index may be in a sense "inverted" such that it stores posting lists of documents per word. Querying the forward index may require sequential iterations through each document and to each word to verify a matching document. The time, memory, and processing resources to perform such a query are not always technically realistic. In contrast, one advantage of the inverted index is that comparatively less time, memory and processing resources are required for querying such data structure.

In at least one broad aspect of the present technology, the inverted index stores data for respective "term—document pairs". It is contemplated that data stored in association with respective term—document (DT) pairs comprises "query-independent" data. In at least some embodiments of the present technology, the query-independent data for a given TD pair may be indicative of a term-specific occurrence of a respective term in the content associated with the respective document. It can be said that the inverted index stores "term-specific" data for respective terms as opposed to data that depends on more than one term from a query.

In at least some aspects of the present technology, developers of the present technology have devised methods and servers for leveraging query-independent data stored in the inverted index in order to generate, in real-time, during a given search performed in response to a submitted query, one or more "query-dependent features" based on retrieved query-independent data for one or more terms from the submitted query. In at least some embodiments of the present technology, it can be said that data having been previously stored in the inverted index may be retrieved during a search, in real-time, and processed by a plurality of computer-implemented algorithms that are herein referred to as "dynamic feature generator" that is broadly configured to generate one or more dynamic features where each dynamic feature depends one more than one term from the query.

In at least one embodiment, the dynamic feature generator executed by the server is configured to (i) use query-independent data associated with respective terms for (ii) generating a query-dependent feature indicative of a "group occurrence" of at least a pair of terms from the query in the content associated with the respective document. It is contemplated that the server is configured to use the query-dependent feature for ranking a respective document amongst a plurality of potentially relevant documents in response to the query.

In a first broad aspect of the present technology, there is provided a method of ranking digital documents in response to a query. The digital documents are potentially relevant to the query having a first term and a second term. The query has been submitted by a user of an electronic device communicatively coupled with a server hosting a search engine. The search engine is associated with an inverted index storing information associated with document-term (DT) pairs. The method is executable by the server. The method comprises, for a given document from a plurality of potentially relevant documents, accessing, by the server, the inverted index for retrieving query-independent data for a first DT pair and a second DT pair. The first DT pair has the given document and the first term. The second DT pair has the given document and the second term, The query-independent data is indicative of (i) a term-specific occurrence of the first term in content associated with the given document and (ii) a term-specific occurrence of the second term in the content associated with the given document. The method comprises, for a given document from a plurality of potentially relevant documents, generating, by the server, a query-dependent feature using the query-independent data retrieved for the first DT pair and the second DT pair, The query-dependent feature is indicative of a group occurrence of the first term with the second term in the content associated with the given document. The method comprises, for a given document from a plurality of potentially relevant documents, generating, by the server, a ranking feature for the given document based on at least the first term, the second term, and the query-dependent feature. The method comprises ranking, by the server, the given document from the plurality of potentially relevant documents based on at least the ranking feature.

In some embodiments of the method, the generating the ranking feature for the given document is performed by a Neural Network (NN).

In some embodiments of the method, the method further comprises training, by the server, the NN to generate the ranking feature. The training the NN comprises generating, by the server, a training set for a training document-query (DQ) pair to be used during a given training iteration of the NN. The training DQ pair has a training query and a training document. The generating comprises generating, by the server, a plurality of training term embeddings based on respective terms from the training query. The generating comprises accessing, by the server, the inverted index associated with the search engine for retrieving a plurality of query-independent datasets associated with respective ones of a plurality of training DT pairs. A given one of the plurality of training DT pairs includes the training document and a respective one of the plurality of terms from the training query. The generating comprises generating, by the server, a plurality of training feature vectors for the plurality of training DT pairs using the plurality of query-independent datasets. The training the NN comprises during a given training iteration of the NN, inputting, by the server into the NN, the plurality of training term embeddings and the plurality of training feature vectors for generating a predicted ranking feature for the training DQ pair. The training the NN comprises during a given training iteration of the NN, adjusting, by the server, the NN based on a comparison between the label and the predicted ranking feature so that the NN generates for a given in-use DQ pair a respective predicted ranking feature that is indicative of relevance of a respective in-use document to a respective in-use query.

In some embodiments of the method, the query-independent data has been stored in the inverted index prior to receipt of the query from the electronic device, and wherein the query-dependent feature is generated after the receipt of the query from the electronic device.

In some embodiments of the method, the query-dependent feature is generated using the query-independent data in real-time during a document ranking procedure of the search engine.

In some embodiments of the method, the ranking is performed by a decision-tree-based Machine Learning Algorithm (MLA) configured to rank the plurality of potentially relevant documents based on their relevance to the query.

In some embodiments of the method, the method further comprises, for a given one of the plurality of terms, determining a similar term. When accessing the inverted index for retrieving the query-independent data, the retrieved query-independent data comprises query-independent data for a third DT pair, where the third DT pair has the given document and the similar term.

In some embodiments of the method, the accessing the inverted index is for further retrieving a query-independent content-based data associated with the first DT pair and the second DT pair. The query-independent content-based data is indicative of a textual context of the respective term within the content associated with the given document.

In some embodiments of the method, the term-specific occurrence of the first term comprises at least one of: one or more positions of the first term in a title associated with given document; one or more positions of the first term in a URL associated with the given document; and one or more positions of the first term in a body of the given document.

In some embodiments of the method, the group occurrence of the first term with the second term in the content associated with the given document comprises at least one of: a number of times the second term from the query is included in addition to the first term in a title associated with the given document; a number of times the second term from the query is included in addition to the first term in a URL associated with the given document; and a number of times the second term from the query is included in addition to the first term in a body of the given document.

In a second broad aspect of the present technology, there is provided a server for ranking digital documents in response to a query. The digital documents are potentially relevant to the query having a first term and a second term. The query has been submitted by a user of an electronic device communicatively coupled with the server hosting a search engine. The search engine is associated with an inverted index storing information associated with document-term (DT) pairs. The server is configured to, for a given document from a plurality of potentially relevant documents, access the inverted index for retrieving query-independent data for a first DT pair and a second DT pair. The first DT pair has the given document and the first term, and the second DT pair has the given document and the second term. The query-independent data being indicative of (i) a term-specific occurrence of the first term in content associated with the given document and (ii) a term-specific occurrence of the second term in the content associated with the given document. The server is configured to, for a given document from a plurality of potentially relevant documents, generate a query-dependent feature using the query-independent data retrieved for the first DT pair and the second DT pair. The query-dependent feature is indicative of a group occurrence of the first term with the second term in the content associated with the given document. The server is configured to, for a given document from a plurality of potentially relevant documents, generate a ranking feature for the given document based on at least the first term, the second term, and the query-dependent feature. The server is configured to rank the given document from the plurality of potentially relevant documents based on at least the ranking feature.

In some embodiments of the server, the server employs a Neural Network for generating the ranking feature for the given document.

In some embodiments of the server, the server is further configured to train the NN to generate the ranking feature. The server is configured to generate a training set for a training document-query (DQ) pair to be used during a given training iteration of the NN. The training DQ pair has a training query and a training document. To generate the training set the server is configured to generate a plurality of training term embeddings based on respective terms from the training query. To generate the training set the server is configured to access the inverted index associated with the search engine for retrieving a plurality of query-independent datasets associated with respective ones of a plurality of training DT pairs. A given one of the plurality of training DT pairs includes the training document and a respective one of the plurality of terms from the training query. To generate the training set the server is configured to generate a plurality of training feature vectors for the plurality of training DT pairs using the plurality of query-independent datasets. The server is configured to, during a given training iteration of the NN, input, by the server into the NN, the plurality of training term embeddings and the plurality of training feature vectors for generating a predicted ranking feature for the training DQ pair. The server is configured to, during a given training iteration of the NN, adjust the NN based on a comparison between the label and the predicted ranking feature so that the NN generates for a given in-use DQ pair a respective predicted ranking feature that is indicative of relevance of a respective in-use document to a respective in-use query.

In some embodiments of the server, the query-independent data has been stored in the inverted index prior to receipt of the query from the electronic device, and wherein the query-dependent feature is generated after the receipt of the query from the electronic device.

In some embodiments of the server, the query-dependent feature is generated using the query-independent data in real-time during a document ranking procedure of the search engine.

In some embodiments of the server, the server is configured to rank by employing a decision-tree-based Machine Learning Algorithm (MLA) configured to rank the plurality of potentially relevant documents based on their relevance to the query.

In some embodiments of the server, the server is further configured to, for a given one of the plurality of terms, determine a similar term. When accessing the inverted index for retrieving the query-independent data, the retrieved query-independent data comprises query-independent data for a third DT pair, the third DT pair having the given document and the similar term.

In some embodiments of the server, the server is configured to access the inverted index for further retrieving a query-independent content-based data associated with the first DT pair and the second DT pair. The query-independent content-based data is indicative of a textual context of the respective term within the content associated with the given document.

In some embodiments of the server, the term-specific occurrence of the first term comprises at least one of: one or more positions of the first term in a title associated with given document; one or more positions of the first term in a URL associated with the given document; and one or more positions of the first term in a body of the given document.

In some embodiments of the server, the group occurrence of the first term with the second term in the content associated with the given document comprises at least one of: a number of times the second term from the query is included in addition to the first term in a title associated with the given document; a number of times the second term from the query is included in addition to the first term in a URL associated with the given document; and a number of times the second term from the query is included in addition to the first term in a body of the given document.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
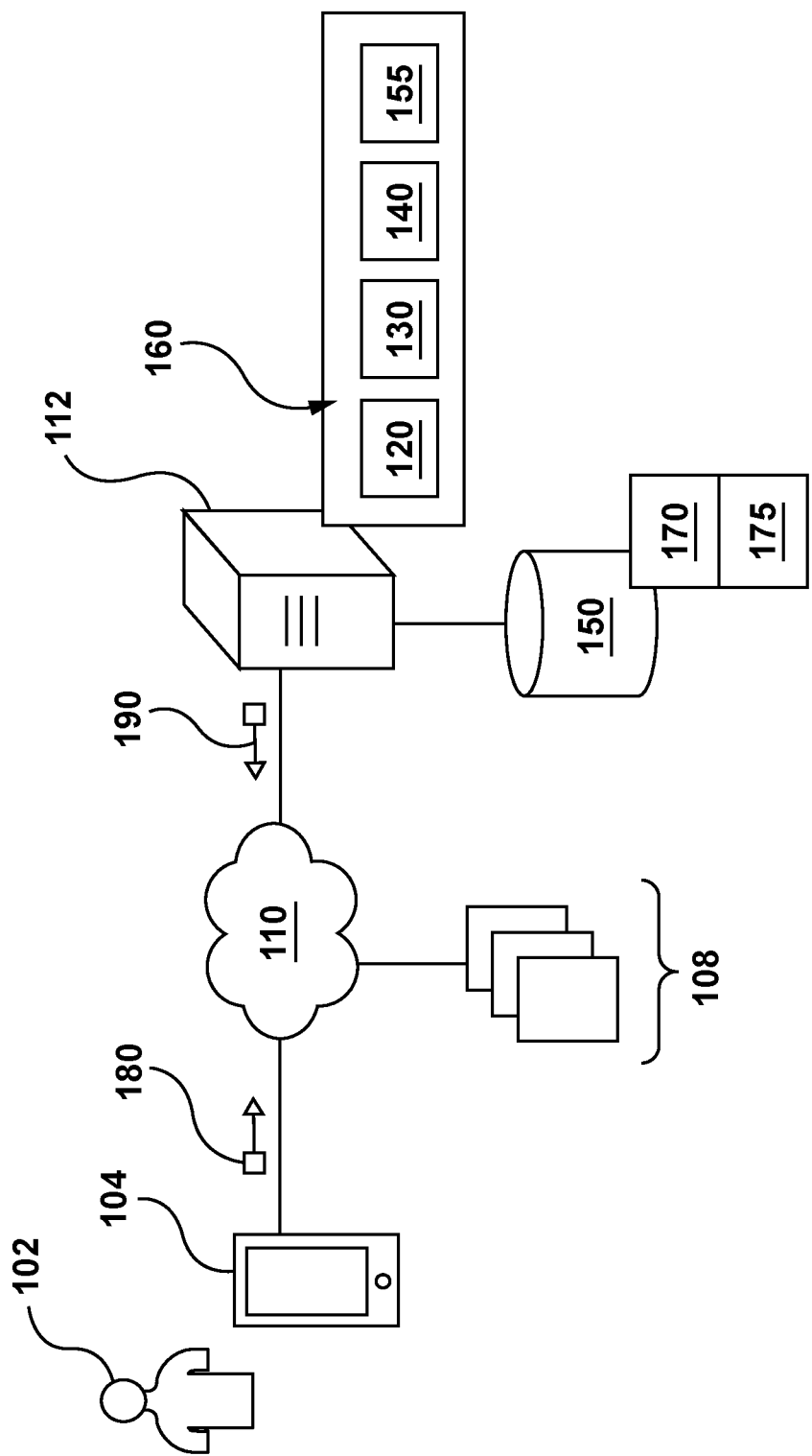
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology.

In the illustrated example, the system 100 may be employed for providing one or more online services to a given user. To that end, the system 100 comprises inter alia an electronic device 104 associated with the user 101, a server 112, a plurality of resource servers 108, and a database sub-system 150.

In the context of the present technology, the system 100 is employed to provide search engine services. For example, the user 101 may submit a given query via the electronic device 104 to the server 112 which, in response, is configured to provide search results to the user 101. The server 112 generates these search results based on information that has been retrieved from, for example, the plurality of resource servers 108 and stored in the database sub-system 150. These search results provided by the system 100 may be relevant to the submitted query.

It can be said that the server 112 is configured to execute a plurality of computer-implemented algorithms that are hereinafter referred to as "a search engine" 160. As it will become apparent from the description herein further below, the search engine 160 is generally configured to identify potentially relevant digital documents for a query and rank them based on their relevance to the query.

Electronic Device

As mentioned above, the system 100 comprises the electronic device 104 associated with the user 101. As such, the electronic device 104, or simply "device" 102 can sometimes be referred to as a "client device", "end user device" or "client electronic device". It should be noted that the fact that the electronic device 104 is associated with the user 101 does not need to suggest or imply any mode of operation— such as a need to log in, a need to be registered, or the like.

In the context of the present specification, unless provided expressly otherwise, "electronic device" or "device" is any computer hardware that is capable of running a software appropriate to the relevant task at hand. Thus, some non-limiting examples of the device 104 include personal computers (desktops, laptops, netbooks, etc.), smartphones, tablets and the like. The device 104 comprises hardware and/or software and/or firmware (or a combination thereof), as is known in the art, to execute a given browser application (not depicted).

Generally speaking, the purpose of the given browser application is to enable the user 101 to access one or more web resources. How the given browser application is implemented is not particularly limited. One example of the given browser application that is executable by the device 104 may be embodied as a Yandex™ browser. For example, the user 101 may use the given browser application to (i) navigate to a given search engine website, and (ii) submit a query in response to which (s)he is to be provided with relevant search results.

The device 104 is configured to generate a request 180 for communicating with the server 112. The request 180 may take form of one or more data packets comprising information indicative of, in one example, the query submitted by the user 101. The device 104 is also configured to receive a response 190 from the server 112. The response 190 may take form of one or more data packets comprising information indicative of, in one example, search results that are relevant to the submitted query and computer-readable instructions for displaying by the given browser application to the user 101 these search results.

Communication Network

The system 100 comprises a communication network 110. In one non-limiting example, the communication network 110 may be implemented as the Internet. In other non-limiting examples, the communication network 110 may be implemented differently, such as any wide-area communication network, local-area communication network, a private communication network and the like. In fact, how the communication network 110 is implemented is not limiting and will depend on inter alia how other components of the system 100 are implemented.

The purpose of the communication network 110 is to communicatively couple at least some of the components of the system 100 such as the device 104, the plurality of resource servers 108 and the server 112. For example, this means that the plurality of resource servers 108 is accessible via the communication network 110 by the device 104. In another example, this means that the plurality of resource servers 108 is accessible via the communication network 110 by the server 112. In a further example, this means that the server 112 is accessible via the communication network 110 by the device 104.

The communication network 110 may be used in order to transmit data packets amongst the device 104, the plurality of resource servers 108 and the server 112. For example, the communication network 110 may be used to transmit the request 180 from the device 104 to the server 112. In another example, the communication network 110 may be used to transmit the response 190 from the server 112 to the device 104.

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 104 and/or by the server 106. Which type of resources the plurality of resource servers 108 is hosting is not limiting. However, in some embodiments of the present technology, the resources may comprise digital documents, or simply "documents", that are representative of web pages.

For example, the plurality of resource servers 108 may host web pages, which means that the plurality of resource servers 108 may store documents representative of web pages and which are accessible by the device 104 and/or by the server 112. A given document may be written in a mark-up language and may comprise inter alia (i) content of a respective web page and (ii) computer-readable instructions for displaying the respective web page (content thereof).

A given one of the plurality of resource servers 108 may be accessed by the device 104 in order to retrieve a given document stored on the given one of the plurality of resource servers 108. For example, the user 101 may enter a web address associated with a given web page in the given browser application of the device 104 and, in response, the device 104 may access a given resource server hosting the given web page in order to retrieve the document representative of the given web page for rendering the content of the web page via the given browser application.

A given one of the plurality of resource servers 108 may be accessed by the server 112 in order to retrieve a given document stored on the given one of the plurality of resource servers 108. The purpose for the server 112 accessing and retrieving documents from the plurality of resource servers 108 will be described in greater detail herein further below.

Database Sub-System

The server 112 is communicatively coupled to the database sub-system 150. Generally speaking, the database sub-system 150 is configured to acquire data from the server 112, store the data, and/or provide the data to the server 106 for further use.

In some embodiments, the database sub-system 150 may be configured to store information associated with the server 112 herein referred to as "search engine data" 175. For example, the database sub-system 150 may store information about previously performed searches by the search engine 160, information about previously submitted queries to the server 112, and about documents that have been provided by the search engine 160 of the server 112 as search results.

As part of the search engine data 175, it is contemplated that the database sub-system 150 may store query data associated with respective queries submitted to the search engine 160. Query data associated with a given query may be of different types and is not limiting. For example, the database sub-system 150 may store query data for respective queries such as, but not limited to:
 popularity of a given query;
 frequency of submission of the given query;
 number of clicks associated with the given query;
 indications of other submitted queries associated with the given query;
 indications of documents associated with the given query;
 other statistical data associated with the given query;
 search terms associated with the given query;
 number of characters within the given query; and
 other query-intrinsic characteristics of the given query.

As part of the search engine data 175, it is contemplated that the database sub-system 150 may also store document data associated with respective documents. Document data associated with a given document may be of different types and is not limiting. For example, the database sub-system 150 may store document data for respective documents such as, but not limited to:
 popularity of a given document;
 click-through-rate for the given document;
 time-per-click associated with the given document;
 indications of queries associated with the given document;
 other statistical data associated with the given document;
 text associated with the given document;
 file size of the given document; and
 other document-intrinsic characteristics of the given document.

As it will be discussed in greater detail with reference to FIG. 2 herein further below, the database sub-system 150 may be configured to store content associated with respective digital documents on a document-by-document basis. For example, the database sub-system 150 may be configured to store content associated with a given digital document.

As part of the search engine data 175, it is contemplated that the database sub-system 150 may also store user data associated with respective users. User data associated with a given user may be of different types and is not limiting. For example, the database sub-system 150 may store user data for respective web users such as, but not limited to:
 past web session data associated with a given user;
 past queries submitted by the given user;
 "click" history data associated with the given user;
 other interaction data between with the given user and documents; and
 user preferences.

As illustrated in FIG. 1, the database sub-system 150 is also configured to store a structured collection of data hereinafter referred to as "an inverted index" 170. Broadly speaking, the inverted index 170 is a data structure that can be said to be a component of the search engine 160. For example, initially, a forward index may be generated, which stores lists of words (or terms) per document—then, the forward index may be inverted such that it stores posting lists of documents per term. Querying the forward index may require sequential iteration through each document and to each term to verify a matching document. The time, memory, and processing resources to perform such a query are not always technically realistic. In contrast, one advantage of the inverted index 170 is that comparatively less time, memory and processing resources are required for querying such data structure in real-time.

As it will be described in greater details herein further below with reference to FIG. 2, the inverted index 170 is configured to store a plurality of posting lists, each of which is associated with a respective term, and where a given posting list comprises a plurality of documents containing the respective term. Additionally, the inverted index 170 is configured to store data for respective "term-document" pairs.

Server

The system 100 comprises the server 112 that may be implemented as a conventional computer server. In an example of an embodiment of the present technology, the server 112 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 112 is a single server. In alternative non-limiting embodiments of the present technology, the functionality of the server 106 may be distributed and may be implemented via multiple servers.

As illustrated on FIG. 1, the server 112 is configured to host the search engine 160 for providing search engine services. In some embodiments, the server 112 may be under control and/or management of a search engine provider (not depicted) such as, for example, an operator of the Yandex™ search engine. As such, the server 112 may be configured to host the search engine 160 for performing one or more searches responsive to queries submitted by users of the search engine 160.

For example, the server 112 may receive the request 180 from device 104 indicative of the query submitted by the user 101. The server 112 may perform a search responsive to the submitted query for generating search results that are relevant to the submitted query. As a result, the server 112 may be configured to generate the response 190 indicative of the search results and may transmit the response 190 to the device 104 for display of the search results to the user 101 via the given browser application, for example.

The search results generated for the submitted query may take many forms. However, in one non-limiting example of the present technology, the search results generated by the server 112 may be indicative of documents that are relevant to the submitted query. How the server 112 is configured to determine and retrieve documents that are relevant to the submitted query will become apparent from the description herein.

The server 106 may also configured to execute a crawler application 120. Broadly speaking, the crawler application 120 may be used by the server 112 in order to "visit" resources accessible via the communication network 110 and to retrieve/download them for further use. For example, the crawler application 120 may be used by the server 106 in order to access the plurality of resource servers 108 and to retrieve/download documents representative of web pages hosted by the plurality of resource servers 108.

It is contemplated that the crawler application 120 may be periodically executable by the server 112 in order to retrieve/download documents that have been updated and/or became accessible over the communication network 110 since a previous execution of the crawler application 120.

The server 112 may also be configured to execute "a ranking model" 130 broadly configured to use information about a given query and a plurality of potentially relevant documents for ranking those documents in response to the query. In at least one embodiment of the present technology, the ranking model 130 may be implemented as one or more Machine Learning Algorithms (MLAs). It is contemplated that the plurality of potentially relevant documents may be identified by the server 112 using information stored in the inverted index 170.

Broadly speaking, a given MLA is first "built" (or trained) using training data and training targets. During a given training iteration, the MLA is inputted with a training input, and generates a respective prediction. The server 112 is then configured to, in a sense, "adjust" the MLA based on a comparison of the prediction against a respective training target for the training input. For example, the adjustment may be performed by the server 112 employing one or more machine learning techniques such as, but not limited to, a back-propagation technique. After a large number of training iterations, the MLA is thus "adjusted" in a manner that allows making predictions based on inputted data such that those predictions are close to the respective training targets.

In at least some embodiments of the present technology, the ranking model 130 may be implemented as a given decision-tree based MLA. Broadly speaking, a given decision-tree based MLA is a machine learning model having one or more "decision trees" that are used (i) to go from observations about an object (represented in the branches) to conclusions about the object's target value (represented in the leaves). In one non-limiting implementation of the present technology, the decision-tree based MLA can be implemented in accordance with the CatBoost framework.

How the decision-tree based MLA can be trained in accordance with at least some embodiments of the present technology is disclosed in a US Patent Publication no. 2019/0164084, entitled "METHOD OF AND SYSTEM FOR GENERATING PREDICTION QUALITY PARAMETER FOR A PREDICATION MODEL EXECUTED IN A MACHINE LEARNING ALGORITHM", published on May 30, 2019, content of which is incorporated by reference herein in its entirety. Additional information regarding the CatBoost library, its implementation, and gradient boosting algorithms is available at https://catboost.ai.

Figure 6:
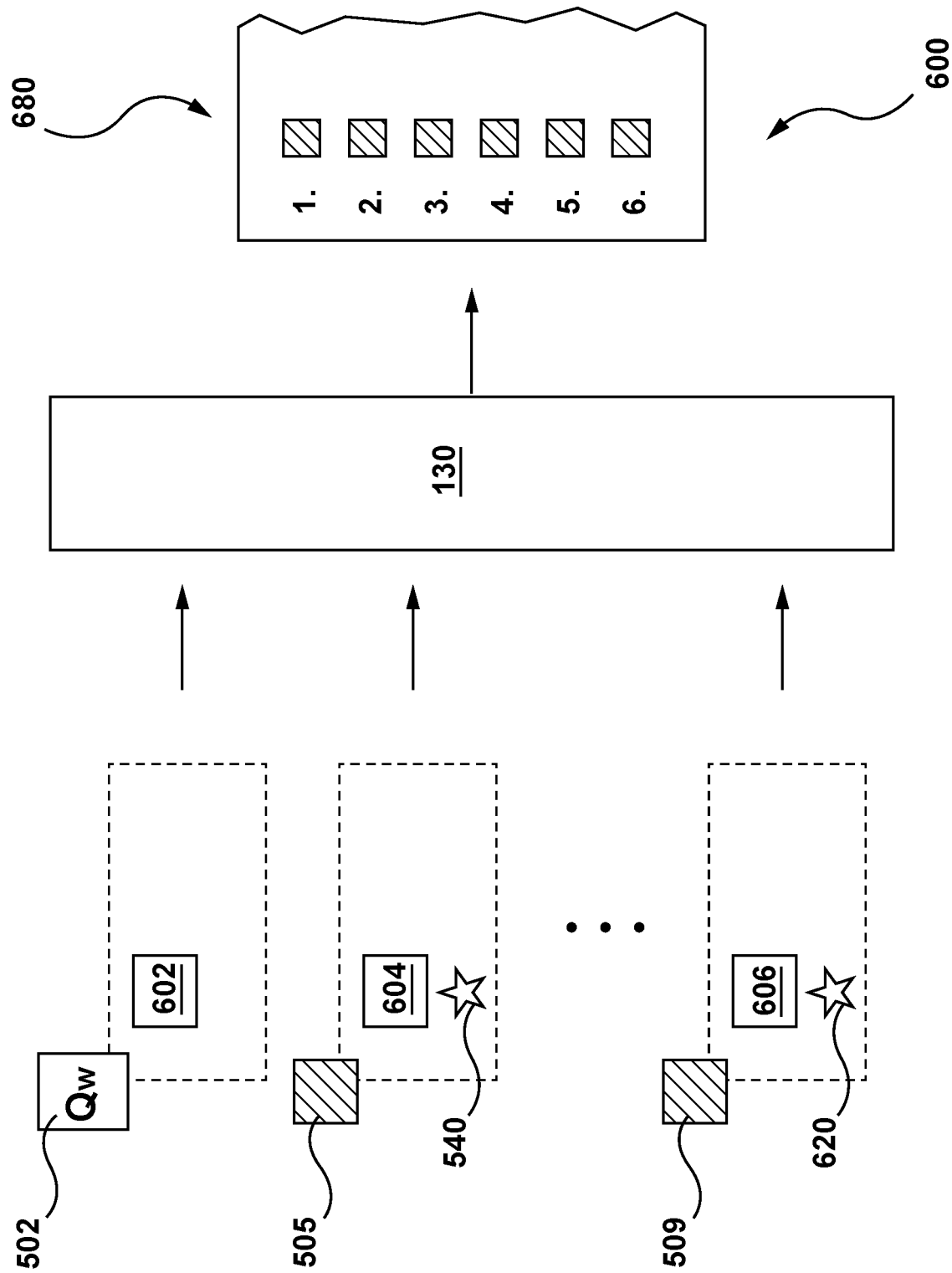
FIG. 6 depicts a representation of how a ranking model of the system of FIG. 1 is configured to generate a ranked list of documents, in accordance with non-limiting embodiments of the present technology

What data is used by the ranking model 130 for generating a ranked list of documents in response to a query will be discussed in greater details herein further below with reference to FIG. 6. However, it should be noted that the ranking model 130 may be configured to use "a ranking feature" for a given "document-query pair" for ranking the respective document in response to the query.

The server 106 is configured to execute "a ranking feature generator" 140 that is broadly configured to use query-dependent data for generating one or more ranking features to be used by the ranking model 130. In at least one embodiment of the present technology, the ranking feature generator 140 may be implemented as a Neural Network (NN).

Generally speaking, NNs are a specific class of MLAs that consist of interconnected groups of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. A given NN is thus a kind of a trained "black box", which can be used in a situation when what is in the "box" can be less important; and where having the "box" provide reasonable answers to given inputs being more important. For example, NNs are commonly used to optimize the distribution of web-traffic between servers and in data processing, including filtering, clustering, signal separation, compression, vector generation and the like.

How the ranking feature generator 140 (e.g., the NN) can be trained for generating a given ranking feature for a given document-query pair will be described in greater details herein further below with reference to FIG. 3. How the ranking feature generator 140 may then be used, in real-time, during its in-use phase, by the search engine 160 will be described in greater details herein further below with reference to FIG. 5. However, it should be mentioned that the ranking feature generator 140 may use query-dependent data that is dynamically generated for a given document-query pair.

The server 112 may also be configured to execute one or more computer-implemented algorithms hereinafter referred to as "a dynamic feature generator" 150 that is broadly configured to use query-independent data retrieved from the inverted index 170 for one or more terms in order to generate in real-time (dynamically) query-dependent data. How query-independent data can be used by the dynamic feature generator 155 for generating query-dependent data and how the dynamic feature generator can be implemented by the server 112 will be discussed in greater details herein further below with reference to FIG. 4.

Figure 2:
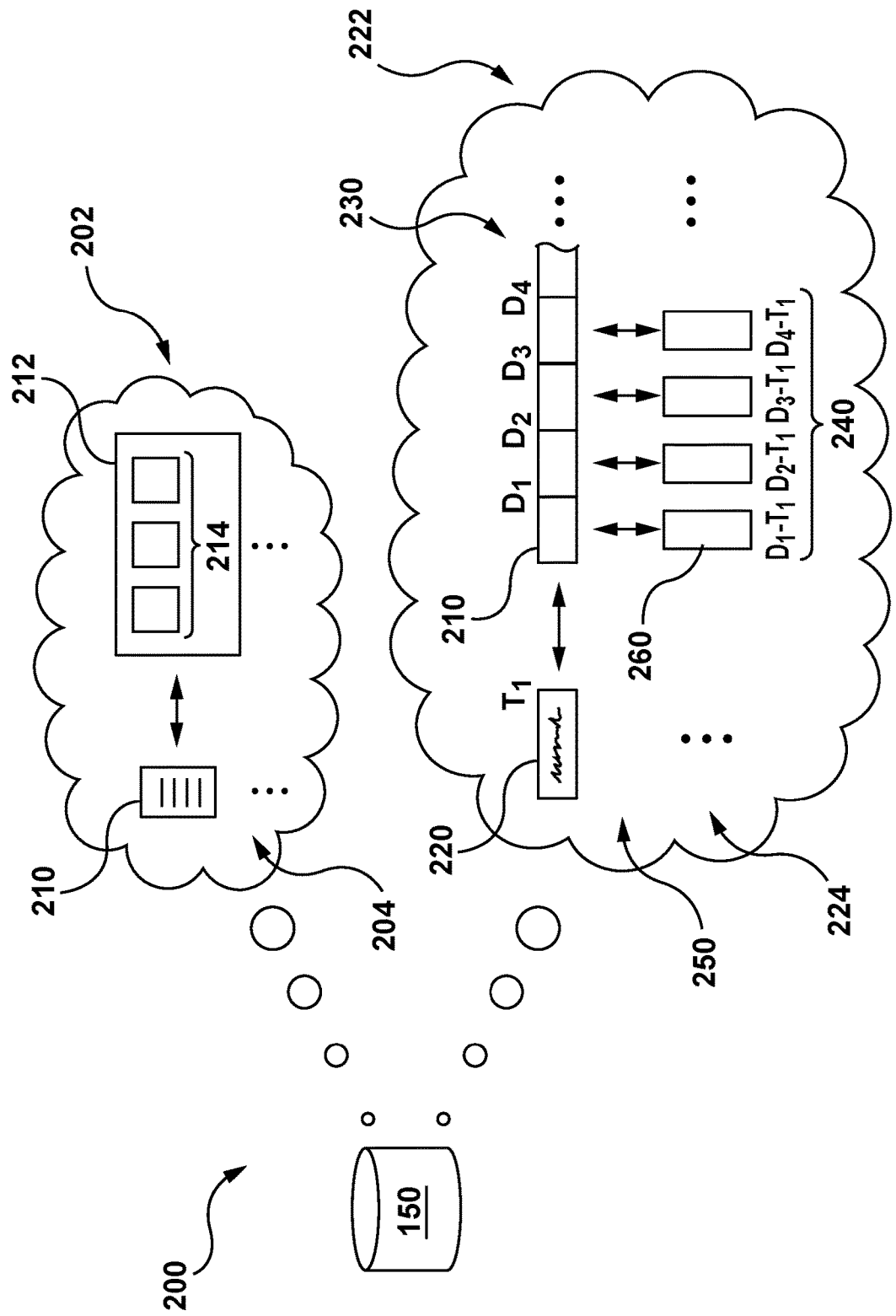
FIG. 2 depicts a representation of data stored by a database sub-system of the system of FIG. 1, in accordance with non-limiting embodiments of the present technology.

With reference to FIG. 2, there is depicted a representation 200 of at least some data stored in the database sub-system 150. For example, there is depicted a representation 202 of at least some document data stored in the database sub-system 150 as part of the search engine data 175, as explained above.

As illustrated, the database sub-system 150 may be configured to store a plurality of documents 204 associated with respective content data. For example, the database sub-system 150 may store a document 210 in association with content data 212. In this example, the document 210 may be a given web page that has been crawled by the crawler application 120 and downloaded from one of the resource servers 108.

The content data 212 may comprise a plurality of content types 214. For example, one of the plurality of content types 214 may include a title of the document 210. In the same example, an other of the plurality of content types 214 may include a Universal Resource Location (URL) associated with the document 210. In the same example, a further one of the plurality of content types 214 may include a body content of the document 210. Additionally or alternatively, other content types to those non-exhaustively listed above may be stored as part of the content data for a given document, without departing from the scope of the present technology.

Furthermore, there is depicted a representation 222 of at least some data stored as part of the inverted index 170. As explained above, the inverted index 170 may store a plurality of posting lists 224 associated with respective terms. Broadly speaking, a given posting list for a given search term will contain references, in the form of the document numbers, for example, to those documents in which the search term occurs. The references in the given posting list could themselves be in numerical order, although there will be gaps between the document numbers as the search term does not occur in documents having the skipped document numbers that form the gaps. For example, the inverted index 170 is configured to store a posting list 250 associated with a term 220 (T1) and a plurality of documents 230. As illustrated, the plurality of documents comprises a document 210 (D1) and other documents that comprise the term 220 (T1) within their content.

It should be noted that a given positing list may comprise data indicative of one or more location pointers regarding the position of the respective term in respective documents.

In some embodiments, it is contemplated that the plurality of posting lists 224 may comprise posting lists for "similar terms". For example, a first term may be similar to a second term if the second term is, but not limited to, a synonym of the first term, a normalized version of the first term, and the like. In this example, the first term may be "job" and the second term may be "work". In this example, the first term may be "working" and the second term may be "work". As it will become apparent from the description below, the server 112 may be configured to identify one or more similar terms to terms from the query and use them, in addition to the terms from the query, for retrieving data from the inverted index 170.

In the context of the present technology, the inverted index 170 is configured to store query-independent data for respective document-term (DT) pairs. For example, the server 112 may be configured to store query-independent data 260 for a D1-T1 pair—that is, the query-independent data 260 is associated with a pair comprise the term 220 and the document 210.

It can be said that the query-independent data 260 includes a DT-pair-specific dataset stored for the respective D1-T1 pair. Similarly, the inverted index 170 may be configured to store a plurality of query-independent data 240 (a plurality of DT-pair-specific datasets) for respective DT pairs.

It should be noted that in the context of the present technology, "query-independent" data can refer to data that is determined and stored without a priori knowing what a current in-use query is. It is contemplated that the query-independent data 260 is indicative of (i) a term-specific occurrence of the term 220 (T1) in content associated with the document 210 (D1).

It is contemplated that the term-specific occurrence of the term 220 (T1) may comprise at least one of: (i) one or more positions of the term 220 (T1) in a title associated with the document 210 (D1), (ii) one or more positions of the term 220 (T1) in a URL associated with the document 210 (D1), and (iii) one or more positions of the term 220 (T1) in a body of the document 210 (D1).

In some embodiments of the present technology, the query-independent data 260 for the D1-T1 pair may further comprise query-independent content-based data associated with the D1-T1 pair. In these embodiments, the query-independent content-based data may be indicative of a textual context of the respective term within the content associated with the given document. In the example of the D1-T1 pair, the query-independent content-based data in the query-independent data 260 may be indicative of one or more neighboring terms to the term 220 (T1) in the content of the document 210 (D1).

As it will become apparent from the description herein further below, the dynamic feature generator 155 may use query-independent data stored in the inverted index 170 for generating in real-time query-dependent data for a given document-query (DQ) pair. The ranking feature generator 140 may then use the query-dependent data and the data associated with various terms from the query for generating a given ranking feature for the given DQ pair.

How the server 112 is configured to use, in real-time, in response to receipt of a current query, the dynamic feature generator 155 for generating, in real-time, the ranking feature by the ranking feature generator 140 will be discussed herein further below with reference to FIG. 5. However, how the server 112 is configured to use the dynamic feature generator 155 for generating training data for training the ranking feature generator 140 will be discussed first with reference to both FIGS. 3 and 4.

Figure 3:
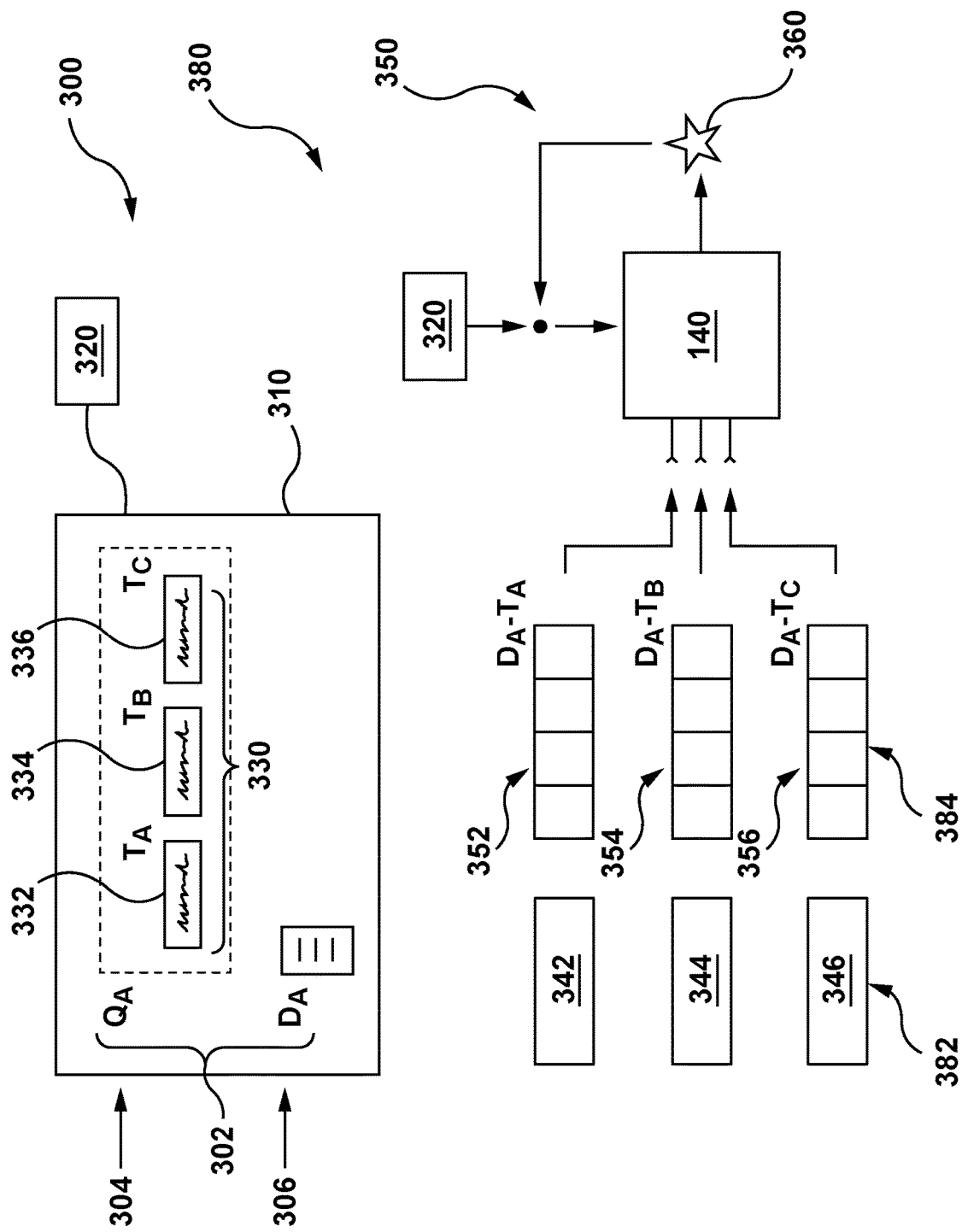
FIG. 3 depicts a representation of a training iteration of a ranking feature generator of the system of FIG. 1, in accordance with non-limiting embodiments of the present technology.

In FIG. 3, there is depicted a representation 300 of a training data 310 and a representation 350 of a single training iteration of the ranking feature generator 140 (the NN). The server 112 may be configured to use the training data 310 may be used for generating a training set to be used for performing the single training iteration.

The training data 310 comprises a training DQ pair 302 having a training query 304 (Qa) and a training document 306 (Da). The training query 304 has a plurality of terms 330 comprising a first term 332 (Ta), a second term 334 (Tb), and a third term 336 (Tc). The training data 310 is associated with a label 320. The label 320 is indicative of a relevance of the training document 306 (Da) to the training query 304 (Qa).

For example, the label 320 may be determined by a human assessor that has been tasked with "assessing" the relevance of the training document 306 (Da) for the training query 304 (Qa). Similarly, one or more human assessors may be tasked with assessing a plurality of training DQ pairs and the plurality of training DQ pairs may be stored in the database system 150 in associated with respective assessed labels.

The server 112 may be configured to use the training data 310 and the label 320 for generating a training set 380 for performing the single training iteration of the ranking feature generator 140 illustrated on FIG. 3. The training set 380 comprises a plurality of training term embeddings 382, a plurality of training feature vectors 384, and the label 320.

The server 112 may be configured to generate the plurality of training term embeddings 382 based on respective terms from the training query 304. Broadly speaking, an embedding is a relatively low-dimensional space into which you can translate high-dimensional vectors. Embeddings make it easier to do machine learning on large inputs like sparse vectors representing words, for example. Ideally, an embedding captures some of the semantics of the input by placing semantically similar inputs close together in the embedding space. It is also contemplated that embeddings can be learned and reused across models. The server 112 may be configured to execute one or more computer-implemented embedding algorithms configured to receive a given training term as input and output a respective training term embedding. For example, the server 112 may be configured to generate a first training term embedding 342 based on the first term 332 (Ta), a second training term embedding 344 based on the second term 334 (Tb), and a third training term embedding 346 based on the third term 336 (Tc).

As mentioned above, the training set 380 comprises the plurality of feature vectors 384. It should be noted that one or more features from the plurality of feature vectors 384 may be generated by the dynamic feature generator 155. As it will now be discussed in greater detail with reference to FIG. 4, one or more features from the plurality of feature vectors 384 may comprise query-dependent data generated by the dynamic feature generator 155 based on query-independent data retrieved for the plurality of training terms 330 from the inverted index 170.

Figure 4:
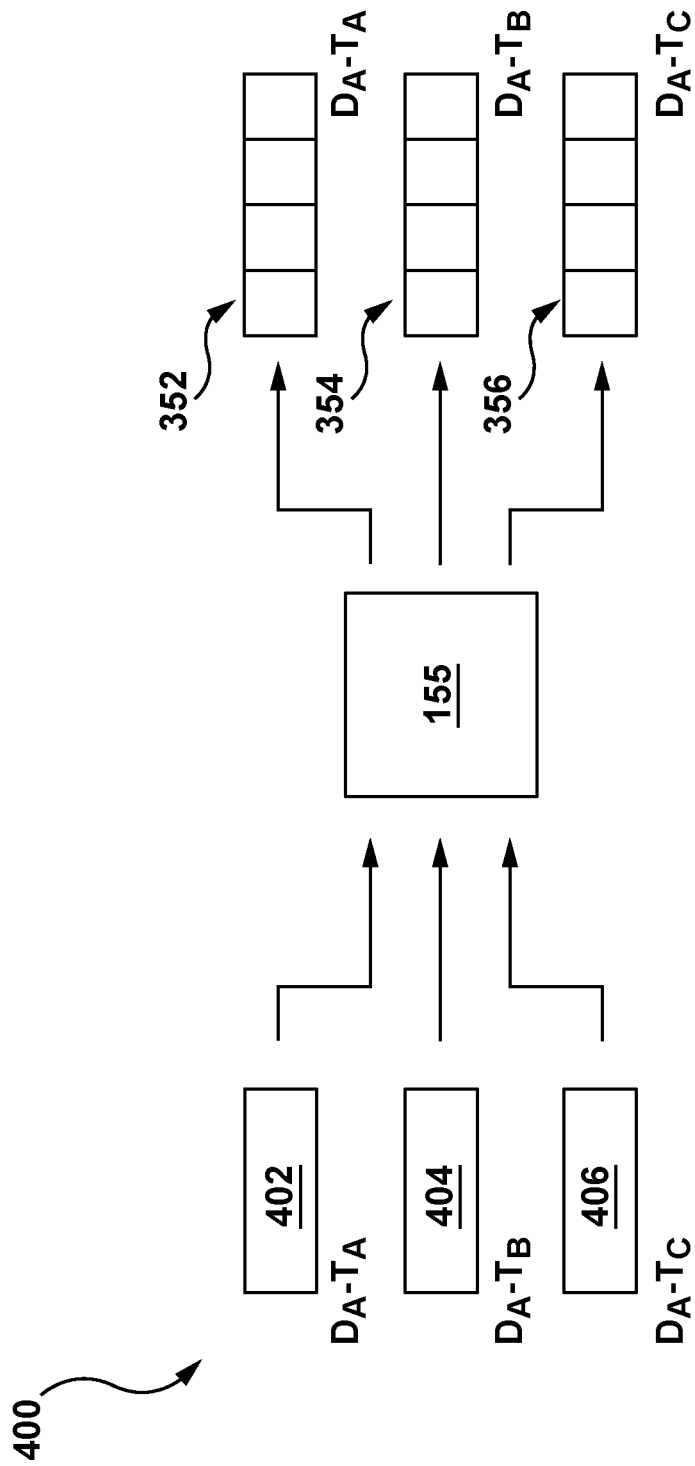
FIG. 4 depicts a representation of how a dynamic feature generator of the system of FIG. 1 is configured to generate query-dependent data based on query-independent data retrieved from an inverted index of the system of FIG. 1, in accordance with non-limiting embodiments of the present technology.

In FIG. 4, there is depicted a representation 400 of how the dynamic feature generator 155 generates the plurality of feature vectors 384 for the training set 380. The server 112 is configured to access the inverted index 170 for retrieving a plurality of query-independent datasets associated with respective training DT pairs—that is, the server 112 may retrieve a first query-independent dataset 402 for the training Da-Ta pair, a second query-independent dataset 404 for the training Da-Tb pair, and a third query-independent dataset 406 for the training Da-Tc pair. It can be said that the first query-independent dataset 402, the second query-independent dataset 404, and the third query-independent dataset 406 represent query-independent data retrieved from the inverted index 170 for the plurality of training DT pairs.

The server 112 is configured to input the so-retrieved query-independent data into the dynamic feature generator 155. Broadly speaking, the dynamic feature generator 155 is configured to generate for each training term from the training query 304 a respective feature vector. In the illustrated example, the dynamic feature generator 155 uses the so-retrieved query-independent data for generating a first feature vector 352 for the training term 332 Ta, a second feature vector 354 for the training term 334 Tb, and a third feature vector 356 for the training term 336 Tc.

It should be noted that the dynamic feature generator 155 may comprise a plurality of computer-implemented algorithms that are configured to process query-independent data for generating a plurality of features (for each training term) the types of which are pre-determined. For example, the types of features to be generated by the dynamic feature generator 155 may have been determined by the operator of the server 112. In this example, the operator may determine the types of features that (s)he finds useful for a specific implementation of the present technology.

In some embodiments, the types of features may include query-independent features and query-dependent features. Developers of the present technology have realized that query-independent data stored in the inverted index 170 may be retrieved in real-time and processed so as to generate query-dependent data. More particularly, developers of the present technology have realized that query-independent datasets retrieved for respective DT pairs, when taken alone, do not include information that depends one more than one term from a query (hence query-independent). However, when the query-independent datasets are retrieved for each DT pair and are analyzed in combination with each other, the server 112 is able to in a sense "extract" from it query-dependent data in a form of one or more query-dependent features.

To better illustrate this, let it be assumed that the query 304 is "table border css" and hence, the term 332 (Ta) is "table", the term 334 (Tb) is "border", and the term 336 (Tc) is "css". Also let it be assumed that the document 306 (Da) is associated with a following URL "https://www.w3schools.com/css/css_table.asp", has a title "CSS styling tables", and the body contains the following sentences "Table Borders", "To specify table borders in CSS, use the border property", and "The example below specifies a black border for <table>, <th>, and <td> elements".

In this example, the first query-independent dataset 402 is indicative of one or more term-specific occurrences of the term 332 (Ta) "table" in content associated with the document. For instance, the first query-independent dataset 402 may be indicative of the presence of the term 332 (Ta) "table" in the title of the document 306. In another instance, the first query-independent dataset 402 may be indicative of the presence of the term 332 (Ta) "table" in the body of the document 306. In a further instance, the first query-independent dataset 402 may be indicative of the presence of the term 332 (Ta) "table" in the URL of the document 306. In yet another instance, the first query-independent dataset 402 may be indicative of a position (or offset) of the term 332 (Ta) "table" in the content of the document 306. In an additional instance, the first query-independent dataset 402 may be indicative of a number of times the term 332 (Ta) "table" occurs in the content of the document 306.

Similarly, the second query-independent dataset 404 is indicative of one or more term-specific occurrences of the term 334 (Tb) "table" in content associated with the document 306. Similarly, the third query-independent dataset 406 is indicative of one or more term-specific occurrences of the term 336 (Tc) "table" in content associated with the document 306. It should be noted that the nature.

It should be noted that the query-independent data can be used for generating a query-dependent feature that is indicative of a group occurrence of a given term with one or more other terms from the query 304.

For example, the operator may have pre-determined that one type of query-dependent feature that the generator 155 is to generate based on the query-independent data is a number of times the a given term from the query 304 is included in addition to a second term in a URL associated with the document 306. As such, when generating the first feature vector 352 for the Da-Ta pair, the server 112 may determine that the term 332 (Ta) "table" does not occur in addition to the term 334 (Tb) "border" in the URL associated with the document 306 ("https://www.w3schools.com/css/css_table.asp"). In this case, the server 112 may determine a value for that feature in the first feature vector 352 to be "1".

In another example, the operator may have pre-determined that one other type of query-dependent feature that the generator 155 is to generate based on the query-independent data is a number of times the a given term from the query 304 is included in addition to a third term in a URL associated with the document 306. As such, when generating the first feature vector 352 for the Da-Ta pair, the server 112 may determine that the term 332 (Ta) "table" occurs once in addition to the presence of the term 336 (Tc) "css" in the URL associated with the document 306 ("https://www.w3schools.com/css/css_table.asp"). In this case, the server 112 may determine a value for that feature in the first feature vector 352 to be "1".

In a further example, the operator may have pre-determined that one other type of query-dependent feature that the generator 155 is to generate based on the query-independent data is a number of times the a given term from the query 304 is included in addition to a first term in a URL associated with the document 306. As such, when generating the third feature vector 356 for the Da-Tc pair, the server 112 may determine that the term 336 (Tc) "css" occurs twice in addition to the presence of the term 332 (Ta) "table" in the URL associated with the document 306 ("https://www.w3schools.com/css/css_table.asp"). In this case, the server 112 may determine a value for that feature in the third feature vector 356 to be "2".

In yet another example, the operator may have pre-determined that one other type of query-dependent feature that the generator 155 is to generate based on the query-independent data is a percentage of terms from the query 304 that occur with the given term in the URL associated with the document 306. As such, when generating the first feature vector 352 for the Da-Ta pair, the server 112 may determine that two of a total of three terms from the query 304 occur with the term 332 (Ta) "table" in the URL associated with the document 306 ("https://www.w3schools.com/css/css_table.asp"). In this case, the server 112 may determine a value for that feature in the first feature vector 352 to be "⅔". However, when generating the second feature vector 354 for the Da-Tb pair, the server 112 may determine that none of the terms from the query 304 occur with the term 332 (Tb) "border" in the URL associated with the document 306 ("https://www.w3schools.com/css/css_table.asp") because the term 332 (Tb) "border" does not occur in the URL. In this case, the server 112 may determine a value for that feature in the second feature vector 354 to be "0".

It should be noted that when generating feature vectors for respective DT pairs, the generator 155 may be configured to generate feature vectors of a pre-determined size. For example, the size may have been determined by the operator based on, for example, on a number of query-dependent features that (s)he finds useful for a specific implementation. Nevertheless, it is contemplated that a given feature vector may comprise, in addition to one or more query-dependent features of different types, query-independent features for a respective term. In one implementation of the present technology, the size of feature vectors generated by the generator 155 is "5".

Returning to the description of FIG. 3, the server 112 generates for the training set 380 the first training feature vector 352, the second training feature vector 354, and the third training feature vector 356 as described above. The server 112 inputs the term embeddings 342, 344, and 346 and the training feature vectors 352, 354, and 356 into the NN that is being trained (the ranking feature generator 140). In some embodiments, the NN may comprise a plurality of parallel input layers, and a plurality of fully connected layers.

It is contemplated that the server 106 may be configured to concatenate term embeddings with respective training feature vectors. For example, the server 106 may be configured to concatenate the term embedding 342 with the training feature vector 352 for generating a concatenated training input. In the same example, the server 106 may be configured to concatenate the term embedding 344 with the training feature vector 354 for generating a concatenated training input. In the same example, the server 106 may be configured to concatenate the term embedding 346 with the training feature vector 356 for generating a concatenated training input. The server 106 may be configured to input into the NN the concatenated inputs so that the NN, in a sense, understands which term embeddings are associated with which training feature vectors.

In response to the input, the NN outputs a predicted ranking feature 360. The server 112 is configured to compare the predicted ranking feature 360 against the label 320. For example, the server 112 may apply a given penalty function during the comparison of the predicted ranking feature 360 against the label 320. The result of the comparison is then used by the server 112 in order to, in a sense, "adjust" the NN such that the NN generates predicted ranking features that are close to the respective labels. For example, the adjustment may be performed via one or more NN training techniques (e.g., back propagation). After a large number of iterations performed in a similar manner, the NN is trained to generate predicted ranking features that are predictions of relevance of respective documents to respective queries.

How the server 112 is configured to employ the ranking feature generator 140 and the dynamic feature generator 155 in real-time for a current query submitted by the user 102 will now be described with reference to FIG. 5. There is depicted a representation 500 of how the server 112 is configured to generate a predicted ranking feature 540 for a given DQ pair.

Let it be assumed that the server 112 receives a current (in-use) query 502 submitted by the user 102 from the electronic device 104 via the request 180. It can be said that once the query 502 is received by the server 112, the server 112 is configured to use the search engine 160 in real-time for generating a given SERP. The query 502 (Qw) has a term 506 (Tx), a term 507 (Ty), and a term 508 (Tz).

The server 112 is configured to determine a plurality of potentially relevant documents 504 for the in-use query 502. In some embodiments, the server 112 may use one or more computer-implemented procedures for determining a plurality of documents that is potentially relevant to the in-use query 502. It is contemplated that the server 112 may use known techniques in the art for identifying which documents are to be included in the plurality of potentially relevant documents 504.

The server 112 is configured to generate predicted ranking features for respective ones from the plurality of potentially relevant documents 504. In one example, the server 112 may be configured to generate the predicted ranking feature 540 for the pair including the query 502 (Qw) and a document 505 (Dw) from the plurality of potentially relevant documents 504.

The server 112 is configured to access the inverted index 170 for retrieving query-independent data 510. The query-independent data 510 comprises a first query-independent dataset 512 for the Dw-Tx pair, a second query-independent dataset 514 for the Dw-Ty pair, and a third query-independent dataset 516 for the Dw-Tz pair.

In some embodiments, it can be said that the query-intendent data may be "term-specific" data. It should be noted that the first query-independent dataset 512 for the Dw-Tx pair is indicative of a term-specific occurrence of the term 506 (Tx) in the content of the document 505 (Dw), the second query-independent dataset 514 for the Dw-Ty pair is indicative of a term-specific occurrence of the term 507 (Tx) in the content of the document 505 (Dw), and a third query-independent dataset 516 for the Dw-Tz pair is indicative of a term-specific occurrence of the term 508 (Tz) in the content of the document 505 (Dw).

In some embodiments, the query-independent data 510 may further comprise query-independent (term-specific) content-based data indicative of a textual context of the respective term within the content associated with the given document. For example, the textual context may include a preceding term and a next term to the respective term within the content associated with the given document.

The server 112 is configured to input the query-independent data 510 into the dynamic feature generator 155 for generating a plurality of feature vectors comprising a first feature vector 532, a second feature vector 534, and a third feature vector 536. As explained above, the first feature vector 532, the second feature vector 534, and the third feature vector 536 comprise at least one query-dependent feature indicative of a group occurrence of a respective term with one or more other terms from the query 502.

In at least some embodiments of the present technology, it can be said that the query-independent data has been stored in the inverted index 170 prior to receipt of the query 502 from the electronic device 104, and the query-dependent feature is generated after the receipt of the query 502 from the electronic device 104. It can also be said that the query-dependent feature is generated using the query-independent data in real-time during a document ranking procedure of the search engine 160. It should be noted that data indicative of the query-dependent feature could not have been stored in the inverted index 170 for a given DT pair prior to the receipt of the query 502 since it depends on one or more other terms from the query 502.

The server 112 is also configured to generate term embeddings 518, 520, and 522 for the terms 506, 507, and 508, respectively. It can be said that the server 112 may be configured to generate an in-use set 550 for input into the ranking feature generator 140 (the trained NN) and where the in-use set 550 comprises the term embeddings 518, 520, and 522 and the feature vectors 532, 534, and 536.

The server 112 is configured to input the in-use set 550 into the ranking feature generator 140 that, in response, generates the predicted ranking feature 540 for the document 505 and the query 502 pair. It is contemplated that the server 106 may be configured to generated concatenated inputs by concatenating the term embedding 518 with the feature vector 532, the term embedding 520 with the feature vector 534, and the term embedding 522 with the feature vector 536, and input the concatenated inputs into the ranking feature generator 140.

As mentioned above, the server 112 may be configured to employ the predicted ranking feature 540 for ranking the document 505 amongst the plurality of potentially relevant documents 504 in response to the query 502. With reference to FIG. 6, there is depicted a representation 600 of how the server 112 is configured to employ the ranking model 130 (e.g., decision-tree based MLA) in order to generate a ranked list of documents 680 for the user 102 in response to the query 502. As seen, the server 112 may input into the ranking model 130 query data 602. For example, the server 112 may access the database sub-system 150 and retrieve information associated with the query 502, such as past interaction data associated with the query 502.

The server 112 may also input, for the document 505, document data 604 and the predicted ranking feature 540. For example, the server 112 may be configured to access the database sub-system 150 and retrieve information associated with the document 505. For example, the document data 604 may comprise content-based information and/or past interaction data associated with the document 505. Similarly, the server 112 may also input, for a document 506 (an other one from the plurality of potentially relevant documents 504), document data 606 and a predicted ranking feature 620. The server 112 may be configured to generate the predicted ranking feature 620 for the document 509—query 502 pair in a similar manner to how the server 112 is configured to generate the predicted ranking feature 640 for the document 505—query 502 pair. The ranking model 130 is configured to generate, as an output, the ranked list of documents 680 that are ranked based on their relevance to the query 502. The server 112 may be configured to use the ranked list of documents 680 in order to generate a SERP and transmit data indicative therefor via the response 190 to the electronic device 104 for display to the user 102.

Figure 7:
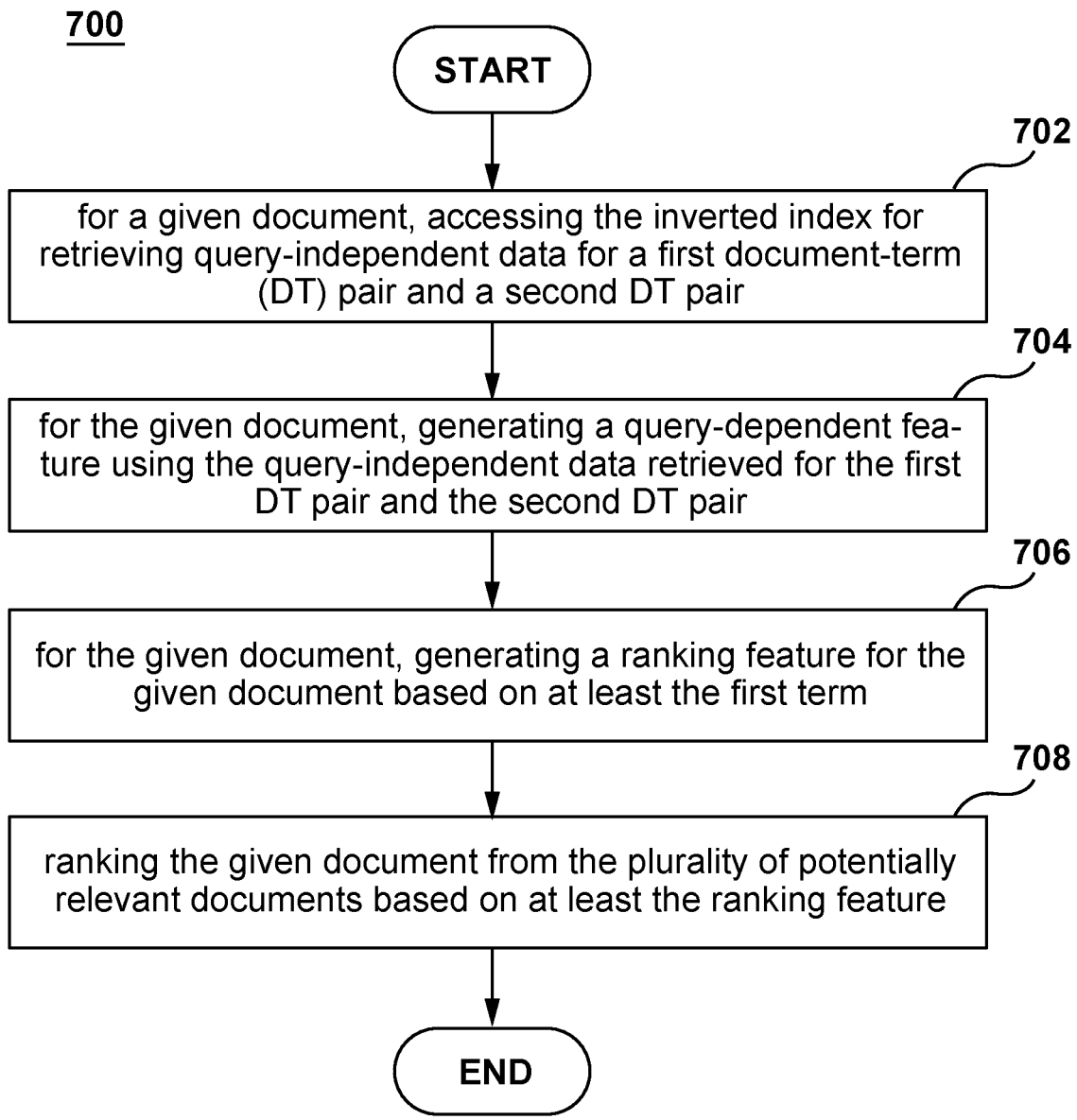
FIG. 7 is a schematic representation of method executable by a server of the system of FIG. 1, in accordance with non-limiting embodiments of the present technology.

With reference to FIG. 7, there is depicted a schematic representation of a method 700 of ranking digital documents in response to a query. For example, the server 112 may be configured to execute the method 700, the steps of which will now be discussed in greater details.

Step 702: For a Given Document, Accessing the Inverted Index for Retrieving Query-Independent Data for a First Document-Term (DT) Pair and a Second DT Pair The method 700 begins at step 702 with the server 112 configured to access the inverted index 170 for retrieve query-independent data for a first DT pair and a second DT pair. For example, let it be assumed that the query comprises a first term and a second term. The first DT pair has the given document and the first term, and the second DT pair has the given document and the second term.

As explained above, the query-independent data retrieved by the server 112 is indicative of (i) a term-specific occurrence of the first term in content associated with the given document and (ii) a term-specific occurrence of the second term in the content associated with the given document.

In some embodiments of the present technology, the server 112 may be configured to retrieve query-intendent data for a term that is similar to one of the first and the second terms. For example, the server 112 may be configured to, for a given one of the plurality of terms from the in-use query, determine a similar term, and when accessing the inverted index 170 for retrieving the query-independent data, the server 112 may be configured to retrieve query-independent data for a third DT pair, where the third DT pair has the given document and the similar term.

In further embodiments, it is contemplated that the server 112 may access the inverted index 170 in order to retrieve query-independent content-based data associated with the first DT pair and the second DT pair. The query-independent content-based data may be indicative of a textual context of the respective term within the content associated with the given document. Additionally or alternatively, the database sub-system 150 may store a forward index in addition to the inverted index 170 and which may be used by the server 112 for so-retrieving the query-independent content-based data (textual context of terms in the document).

It is contemplated that a term-specific occurrence of a given term may comprise at least one of: (i) one or more positions of the first term in a title associated with given document, (ii) one or more positions of the first term in a URL associated with the given document, and (iii) one or more positions of the first term in a body of the given document.

Step 704: For the Given Document, Generating a Query-Dependent Feature Using the Query-Independent Data Retrieved for the First DT Pair and the Second DT Pair The method 700 continues to step 704 with the server 112 configured to generate a query-dependent feature using the query-independent data retrieved for the first DT pair and the second DT pair, and where the query-dependent feature is indicative of a group occurrence of the first term with the second term in the content associated with the given document.

Figure 5:
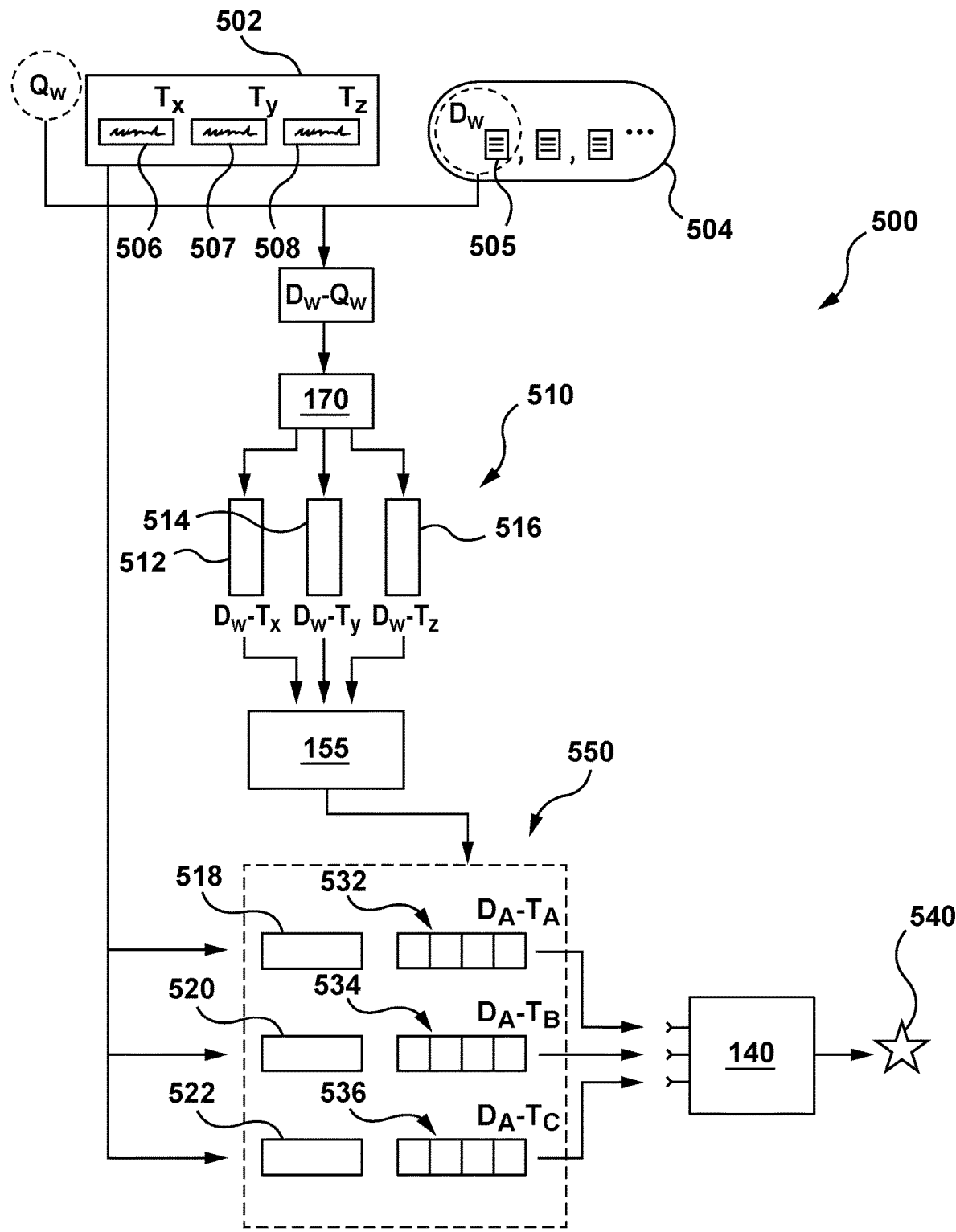
FIG. 5 depicts a representation of an in-use phase of the ranking feature generator of the system of FIG. 1, in accordance with non-limiting embodiments of the present technology.

In one non-limiting example illustrated in FIG. 5, the server 112 may be configured to access the inverted index 170 for retrieving query-independent data 510 (e.g., step 702). The query-independent data 510 comprises a first query-independent dataset 512 for the Dw-Tx pair, a second query-independent dataset 514 for the Dw-Ty pair, and a third query-independent dataset 516 for the Dw-Tz pair.

In some embodiments, it can be said that the query-intendent data may be "term-specific" data. It should be noted that the first query-independent dataset 512 for the Dw-Tx pair is indicative of the term-specific occurrence of the term 506 (Tx) in the content of the document 505 (Dw), the second query-independent dataset 514 for the Dw-Ty pair is indicative of the term-specific occurrence of the term 507 (Tx) in the content of the document 505 (Dw), and a third query-independent dataset 516 for the Dw-Tz pair is indicative of the term-specific occurrence of the term 508 (Tz) in the content of the document 505 (Dw).

As part of the step 704, the server 112 may be configured to input the query-independent data 510 into the dynamic feature generator 155 for generating a plurality of feature vectors comprising a first feature vector 532, a second feature vector 534, and a third feature vector 536. As explained above, the first feature vector 532, the second feature vector 534, and the third feature vector 536 comprise at least one query-dependent feature indicative of a group occurrence of a respective term with one or more other terms from the query 502.

In at least some embodiments of the present technology, it can be said that the query-independent data has been stored in the inverted index 170 prior to receipt of the query 502 from the electronic device 104, and the query-dependent feature is generated after the receipt of the query 502 from the electronic device 104. It can also be said that the query-dependent feature is generated using the query-independent data in real-time during a document ranking procedure of the search engine 160. It should be noted that data indicative of the query-dependent feature could not have been stored in the inverted index 170 for a given DT pair prior to the receipt of the query 502 since it depends on one or more other terms from the query 502.

In at least some embodiments of the present technology, the group occurrence of the first term with the second term in the content associated with the given document comprises at least one of: (i) a number of times the second term from the query is included in addition to the first term in a title associated with the given document, (ii) a number of times the second term from the query is included in addition to the first term in a URL associated with the given document, (iii) a number of times the second term from the query is included in addition to the first term in a body of the given document, and (iv) a positional offset between the first term and the second term in the body of the given document.

Step 706: For the Given Document, Generating a Ranking Feature for the Given Document Based on at Least the First Term The method 700 continues to step 706 with the server 112 configured to generate a ranking feature for the given document based on at least the first term, the second term, and the query-dependent feature. For example, the server 112 may be configured to use the ranking feature generator 140 for generating the ranking feature for the given document.

In some embodiments of the present technology, the ranking feature generator 140 may be implemented as a given NN.

Step 708: Ranking the Given Document from the Plurality of Potentially Relevant Documents Based on at Least the Ranking Feature The method 700 continues to step 708 with the server 112 configured to rank the given document from the plurality of potentially relevant documents based on at least the ranking feature determined at the step 706. For example, the server 112 may be configured to execute the ranking model 130.

In at least some embodiments of the present technology, the ranking model 130 may be implemented as a given decision-tree based MLA. Broadly speaking, a given decision-tree based MLA is a machine learning model having one or more "decision trees" that are used (i) to go from observations about an object (represented in the branches) to conclusions about the object's target value (represented in the leaves). In one non-limiting implementation of the present technology, the decision-tree based MLA can be implemented in accordance with the CatBoost framework.

It is contemplated that the server 112 may be configured to rank the given document by employing a decision-tree-based MLA configured to rank the plurality of potentially relevant documents based on their relevance to the query.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of ranking digital documents in response to a query, the digital documents being potentially relevant to the query having a first term and a second term, the query having been submitted by a user of an electronic device communicatively coupled with a server hosting a search engine, the search engine being associated with an inverted index storing information associated with document-term (DT) pairs, the method executable by the server, the method comprising:

for a given document from a plurality of potentially relevant documents:
  accessing the inverted index for retrieving query-independent data for a first DT pair and a second DT pair, the first DT pair having the given document and the first term, the second DT pair having the given document and the second term,
    the query-independent data being indicative of (i) a term-specific occurrence of the first term in content associated with the given document and (ii) a term-specific occurrence of the second term in the content associated with the given document;
  generating a query-dependent feature using the query-independent data retrieved for the first DT pair and the second DT pair,
    the query-dependent feature being indicative of a group occurrence of the first term with the second term in the content associated with the given document;
  generating a ranking feature for the given document based on at least the first term, the second term, and the query-dependent feature, the generating the ranking feature for the given document being performed by a Neural Network (NN); and
  ranking, by the server, the given document from the plurality of potentially relevant documents based on at least the ranking feature;
wherein the method further comprises training the NN to generate the ranking feature, the training the NN comprising:
  generating a training set for a training document-query (DQ) pair to be used during a given training iteration of the NN, the training DQ pair having a training query and a training document, the training document being associated with a label, the label being indicative of relevance of the training document to the training query, the generating comprising:
    generating a plurality of training term embeddings based on respective terms from the training query;
    accessing the inverted index associated with the search engine for retrieving a plurality of query-independent datasets associated with respective ones of a plurality of training DT pairs,
      a given one of the plurality of training DT pairs including the training document and a respective one of the plurality of terms from the training query;
    generating a plurality of training feature vectors for the plurality of training DT pairs using the plurality of query-independent datasets;
  during a given training iteration of the NN:
    inputting, into the NN, the plurality of training term embeddings and the plurality of training feature vectors for generating a predicted ranking feature for the training DQ pair; and
    adjusting the NN based on a comparison between the label and the predicted ranking feature so that the NN generates for a given in-use DQ pair a respective predicted ranking feature that is indicative of relevance of a respective in-use document to a respective in-use query.

2. The method of claim 1, wherein the query-independent data has been stored in the inverted index prior to receipt of the query from the electronic device, and wherein the query-dependent feature is generated after the receipt of the query from the electronic device.

3. The method of claim 1, wherein the query-dependent feature is generated using the query-independent data in real-time during a document ranking procedure of the search engine.

4. The method of claim 1, wherein the ranking is performed by a decision-tree-based Machine Learning Algorithm (MLA) configured to rank the plurality of potentially relevant documents based on their relevance to the query.

5. The method of claim 1, wherein the method further comprises, for a given one of the plurality of terms, determining a similar term, and wherein:
  when accessing the inverted index for retrieving the query-independent data, the retrieved query-independent data comprises query-independent data for a third DT pair, the third DT pair having the given document and the similar term.

6. The method of claim 1, wherein the accessing the inverted index is for further retrieving a query-independent content-based data associated with the first DT pair and the second DT pair,
  the query-independent content-based data being indicative of a textual context of the respective term within the content associated with the given document.

7. The method of claim 1, wherein the term-specific occurrence of the first term comprises at least one of:
  one or more positions of the first term in a title associated with given document;
  one or more positions of the first term in a URL associated with the given document; and
  one or more positions of the first term in a body of the given document.

8. The method of claim 1, wherein the group occurrence of the first term with the second term in the content associated with the given document comprises at least one of:
  a number of times the second term from the query is included in addition to the first term in a title associated with the given document;
  a number of times the second term from the query is included in addition to the first term in a URL associated with the given document; and
  a number of times the second term from the query is included in addition to the first term in a body of the given document.

9. A server for ranking digital documents in response to a query, the digital documents being potentially relevant to the query having a first term and a second term, the query having been submitted by a user of an electronic device communicatively coupled with the server hosting a search engine, the search engine being associated with an inverted index storing information associated with document-term (DT) pairs, the server configured to:
  for a given document from a plurality of potentially relevant documents:
    access the inverted index for retrieving query-independent data for a first DT pair and a second DT pair, the first DT pair having the given document and the first term, the second DT pair having the given document and the second term,
      the query-independent data being indicative of (i) a term-specific occurrence of the first term in content associated with the given document and (ii) a term-specific occurrence of the second term in the content associated with the given document;
    generate a query-dependent feature using the query-independent data retrieved for the first DT pair and the second DT pair, the query-dependent feature being indicative of a group occurrence of the first term with the second term in the content associated with the given document;

generate a ranking feature for the given document based on at least the first term, the second term, and the query-dependent feature, the server employing a Neural Network (NN) for generating the ranking feature for the given document; and rank the given document from the plurality of potentially relevant documents based on at least the ranking feature;

wherein the server is further configured to train the NN to generate the ranking feature, the server being configured to:

generate a training set for a training document-query (DQ) pair to be used during a given training iteration of the NN, the training DQ pair having a training query and a training document, the training document being associated with a label, the label being indicative of relevance of the training document to the training query, to generate the training set the server being configured to:

generate a plurality of training term embeddings based on respective terms from the training query;

access the inverted index associated with the search engine for retrieving a plurality of query-independent datasets associated with respective ones of a plurality of training DT pairs, a given one of the plurality of training DT pairs including the training document and a respective one of the plurality of terms from the training query;

generate a plurality of training feature vectors for the plurality of training DT pairs using the plurality of query-independent datasets;

during a given training iteration of the NN:

input, by the server into the NN, the plurality of training term embeddings and the plurality of training feature vectors for generating a predicted ranking feature for the training DQ pair; and adjust the NN based on a comparison between the label and the predicted ranking feature so that the NN generates for a given in-use DQ pair a respective predicted ranking feature that is indicative of relevance of a respective in-use document to a respective in-use query.

10. The server of claim 9, wherein the query-independent data has been stored in the inverted index prior to receipt of the query from the electronic device, and wherein the query-dependent feature is generated after the receipt of the query from the electronic device.

11. The server of claim 9, wherein the query-dependent feature is generated using the query-independent data in real-time during a document ranking procedure of the search engine.

12. The server of claim 9, wherein the server is configured to rank by employing a decision-tree-based Machine Learning Algorithm (MLA) configured to rank the plurality of potentially relevant documents based on their relevance to the query.

13. The server of claim 9, wherein the server is further configured to, for a given one of the plurality of terms, determine a similar term, and wherein:

when accessing the inverted index for retrieving the query-independent data, the retrieved query-independent data comprises query-independent data for a third DT pair, the third DT pair having the given document and the similar term.

14. The server of claim 9, wherein the server is configured to access the inverted index for further retrieving a query-independent content-based data associated with the first DT pair and the second DT pair, the query-independent content-based data being indicative of a textual context of the respective term within the content associated with the given document.

15. The server of claim 9, wherein the term-specific occurrence of the first term comprises at least one of:

one or more positions of the first term in a title associated with given document;

one or more positions of the first term in a URL associated with the given document; and one or more positions of the first term in a body of the given document.

16. The server of claim 9, wherein the group occurrence of the first term with the second term in the content associated with the given document comprises at least one of:

a number of times the second term from the query is included in addition to the first term in a title associated with the given document;

a number of times the second term from the query is included in addition to the first term in a URL associated with the given document; and a number of times the second term from the query is included in addition to the first term in a body of the given document.

* * * * *